United States Patent Office 3,488,376
Patented Jan. 6, 1970

3,488,376
ISOCYANATOPHENOLS
Henri Ulrich, North Branford, Conn., assignor to The Upjohn Company, Kalamazoo, Mich., a corporation of Delaware
No Drawing. Filed Jan. 27, 1967, Ser. No. 612,075
Int. Cl. C07c *119/04, 127/12;* A01n *9/20*
U.S. Cl. 260—453                 2 Claims

ABSTRACT OF THE DISCLOSURE

Two-step process for converting a m- or p-aminophenol to the corresponding m- or p-ureidophenol via (1) phosgenation of the aminophenol in an aprotic polar solvent media to yield the corresponding m- or p-isocyanatophenol and (2) reaction of the latter with ammonia or primary or secondary amine to yield the corresponding m- or p-ureidophenols. The ureidophenols are intermediates for known herbicidal carbamates.

BRIEF SUMMARY OF THE INVENTION

This invention relates to an improved process for the preparation of ureidophenols and is more particularly concerned with an improved process for the conversion of m- and p-aminophenols to the corresponding m- and p-ureidophenols and with intermediates produced in said process.

A large number of aryl N-hydrocarbylcarbamates are known in the art and many of these compounds have been found to possess herbicidal activity. Various ureidophenyl carbamates have been shown possess herbicidal activity as disclosed, for example, in Netherlands application 6503645, and members of this class, notably m-(3,3-dimethylureido)phenyl N-t-butylcarbamate, show a broad spectrum of herbicidal activity and are useful as industrial herbicides.

The process of this invention is directed to a novel procedure for the conversion of aminophenols to ureidophenols which latter can then be converted by known procedures to the corresponding ureidophenylcarbamates. The route thereby provided from the starting aminophenol to the ureidophenylcarbamate end-products enables the overall cost of manufacturing the latter compounds to be significantly reduced.

DETAILED DESCRIPTION

The novel process of the invention consists in a process for the preparation of a ureidophenol having the formula:

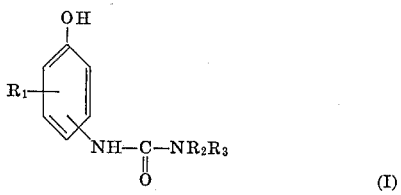

(I)

wherein the ureido group is in a position selected from the consisting of meta and para with respect to the hydroxyl group and wherein $R_2$ and $R_3$ are each selected from the class consisting of hydrogen and hydrocarbyl and $R_1$ represents from 0 to 4 inert substituents, which process comprises the steps of (a) reacting an aminophenol having the formula:

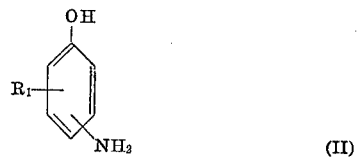

(II)

wherein the amino group is in a position selected from the group consisting of the meta and para positions with respect to the hydroxyl group and $R_1$ is as defined above, whis phosgene it the presence of an aprotic polar organic solvent which does not react with phosgene, to yield the corresponding isocyanatophenol and (b) reacting the latter compound with the appropriate amine $HNR_2R_3$, wherein $R_2$ and $R_3$ are as above defined, to obtain the desired unreidophenol having the formula set forth above.

The term "hydrocarbyl" as used throughout the specification means the monovalent radical obtained by removing one hydrogen atom from the parent hydrocarbon, preferbaly a hydrocarbon containing 1 to 18 carbon atoms, inclusive. Illustrative of such groups are alkyl groups such as methyl, ethyl, propyl, butyl, pentyl, hexyl, octyl, decyl, dodecyl, hexadecyl, octadecyl and the like, including isomeric forms thereof; alkenyl groups such as allyl, butenyl, pentenyl, hexenyl, octenyl, dodecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like including isomeric forms thereof; cycloalkenyl such as cyclopentenyl, cyclohexenyl, cycloheptenyl, and the like including isomeric forms thereof.

The hydrocarbyl groups represented by the parameters $R_2$ and $R_3$, in one of the forms which these parameters can take as described above, can be unsubstituted i.e., can be free of groups other than those containing exclusively C and H atoms, or can be substituted by one or more inert substituents. The term "inert substituent" as used throughout the specification which is inert under the conditions of the process of the invention i.e. does not enter into reaction with the phosgene employed in the first stage of the reaction nor with the isocyanato-phenol, on the one hand, or amine on the other hand, which are used in step (b) of the process of the invention, or in any other way interfere with the reactions taking place in the process of the invention. Examples of inert substituents are alkyl such as defined and exemplified above; alkenyl as defined and exemplified above; aralkyl as defined and exemplified above; alkylthio such as methylthio, ethylthio, propylthio, butylthio, pentylthio, hexylthio, heptylthio, octylthio and the like, including isomeric forms thereof; alkoxy such as methoxy, ethoxy, propoxy, butoxy, pentyloxy, hexyloxy, heptyloxy, octyloxy, and the like, including isomeric forms thereof; halo, i.e. fluoro, chloro, bromo, and iodo; cyano; thiocyano and the like.

It has not hitherto proved possible to prepare an unsubstituted isocyanatophenol by direct phosgenation of the corresponding unsubstituted aminophenol. Thus, reaction of phosgene with o-aminophenol itself inevitably gives rise to the heterocyclic compound 2-benxozainone; see, for example, Chelmicki, Berichte 20, 177, 1887. Similarly, reaction of phosgene with m-aminophenol or p-aminophenol gives rise to the corresponding m- or p-isocyanatophenyl chloroformate the reaction involving both the amino and hydroxy groups of the starting aminophenol; see, for example, Schönherr, J. Praktische Chemie, 67, 339, 1903. Only by introducing substituents into the positions ortho to the hydroxyl group of the aminophenol has it hitherto proved possible, albeit in low yield, to convert the amino group to isocyanato by phosgenation without also incurring reaction at the phenolic hydroxyl group; see German Auslegeschrift 1,170,398.

I have now found that m-aminophenol and p-aminophenol can be converted directly to m-isocyanatophenol and p-isocyanatophenol, respectively, by direct phosgenation thereof using as reaction medium a particular group of organic solvents. I have found further that, under the same conditions, substituted aminophenols, particularly those ortho-substituted aminophenols discussed in the aforesaid German Auslegescrift 1,170,398, can be converted in high yield to the corresponding isocyanatophenols. The yields are in contrast to the low yields obtained in those few cases in which the reaction has hitherto been found possible without the simultaneous conversion of the hydroxy group of the starting phenol.

The organic solvents which it is necessary to employ in order to effect the conversion of the aminophenols to the corresponding isocyanatophenols are those defined as aprotic highly polar organic solvents. The term "aprotic solvent" is used herein in its conventionally accepted sense as designating a solvent which cannot donate or accept a suitably labile hydrogen atom or atoms to form strong hydrogen bonds with an appropriate species; see, for example Parker, Quarterly Reviews XVI, 163, 1962. Aprotic solvents are a well recognised group in the art but not all such solvents can be employed in the process of the invention. Only those aprotic solvents which are highly polar, i.e., have a dielectric constant of at least 2.0, and which do not themselves enter into reaction, to any significant extent, with phosgene, can be employed in the process of the invention.

Examples of highly polar aprotic solvents which do not enter into reaction with phosgene are alkyl alkanoates such as methyl acetate, ethyl acetate, ethyl isobutyrate, hexyl acetate, methyl caproate, ethyl isovalerate, ethyleneglycol diacetate, 2 - ethoxyethyl acetate (Cellosolve acetate) and the like; aliphatic nitriles such as acetonitrile, propionitrile, butyronitrile, valeronitrile, and the like; ethers such as diethyl ether, diisopropyl ether, dibutyl ether, dioxane, ethylene glycol dimethyl ether, propylene glycol dimethyl ether and the like, and nitrohydrocarbons such as nitrobenzene, nitrotoluene and the like.

The process of the invention can be represented schematically as follows:

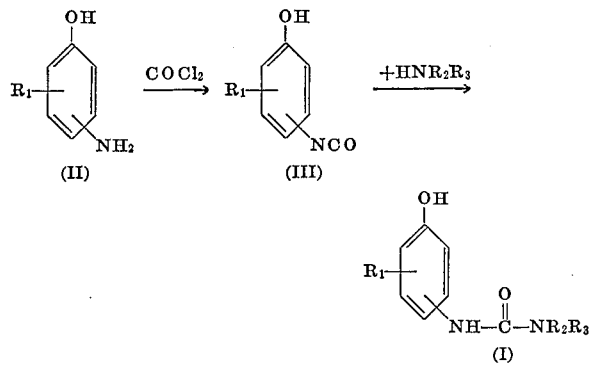

wherein $R_1$, $R_2$ and $R_3$ have the significance hereinbefore defined and the spatial relationship between the hydroxyl group on the one hand and the amino, isocyanato and ureido groups on the other hand is as hereinbefore defined.

In carrying out the first step of the process of the invention, namely the conversion of the aminophenol (II) to the corresponding isocyanatophenol (III) the former is reacted with phosgene in the presence of a highly polar aprotic solvent, as hereinbefore defined, under conditions which are otherwise conventional in the art of phosgenating aromatic amines. The reactants can be brought together in any order to suit the convenience of the operator. When the phosgenation is carried out by adding phosgene, either in gaseous form or in solvent solution, to the aminophenol in the presence of the aprotic solvent it is essential that the aminophenol be converted to its hydrochloride (by methods known in the art, for example by passing an excess of hydrogen chloride into the aminophenol solution) before addition of the phosgene. Preferably, however, the aminophenol is added, in the form of a solution or suspension in the highly polar aprotic solvent, to a preformed solution of phosgene in the same or a different highly polar aprotic solvent. The reaction is exothermic and the addition is made, batchwise or continuously, at such a rate that the desired reaction temperature can be comfortably maintained, if necessary with the aid of outside cooling.

Advantageously the reaction of phosgene and the aminophenol (II) is carried out initially at a temperature within the range of about 0° C. to about 25° C. and preferably within the range of about 5 to 15° C. When the addition of phosgene to aminophenol, or vice versa, is complete, the temperature is raised advantageously to a value within the range of about 40° C. to about 100° C. and preferably within the range of about 60° C. to about 90° C. and is maintained thereat until the reaction is adjudged to be complete. Any of the routine analytical procedures can be employed for determing the endpoint. For example, infrared spectral analysis, analysis of an aliquot for isocyanate equivalent, and/or observation to determine the point at which hydrogen chloride is no longer evolved, are illustrative of such techniques. During this second phase of the phosgenation, carried out at the high temperature, additional phosgene can, if desired, be added to the reaction mixture in gaseous or liquid form or as a solution in the same or a different highly polar aprotic solvent.

The total amount of phosgene employed in the above step of the process of the invention advantageously is at least equimolar with respect to the aminophenol (II). Preferably the amount of phosgene employed is at least 1.2 moles per mole of aminophenol. The upper limit of the amount of phosgene employed is not critical and is dictated largely by economic considerations. Generally speaking the use of amounts of phosgene in excess of about 3 moles per mole of aminophenol is uneconomic in that higher amounts offer no advantage in terms of yield of product or increased rate of reaction. Preferably the proportion of phosgene employed is within the range of about 1.2 moles to about 3 moles per mole of aminophenol.

When the phosgenation of the aminophenol (II) is adjudged complete, using, for example, any of the methods and criteria enumerated above, the corresponding isocyanatophenol (III) so obtained can, if desired, be isolated prior to its use in the second phase of the process of the invention. For example the high polar aprotic solvent can be removed from the reaction product by distillation leaving a residue of the desired isocyanatophenol. The latter can be purified, if desired, for example by distillation under reduced pressure. A particularly convenient method of purifying the isocyanatophenol (III) comprises heating the material for a short period at a temperature of about 50° C. to about 100° C. Under these conditions the compound (III) polymerises to a solid polymer which is insoluble in a wide variety of common organic solvents and from which undesirable monomeric impurities can therefore be removed by trituration with appropriate solvents. The desired isocyanatophenol (III) is readily regenerated from the polymer by heating the latter to a temperature of the order of 200° C. or higher under reduced pressure. Under these conditions the polymer is pyrolysed and the regenerated isocyanatophenol (III) distils in purified form. The formation of, and ready regeneration of isocyanatophenol from, the above polymer forms a useful method of storing the isocyanatophenol prior to use for the purposes described hereinafter or for any other use as an intermediate.

However, it is generally unnecessary to isolate and/or purify the isocyanatophenol (III) prior to subjecting it to the second and final stage of the process of the invention. Thus it is merely necessary to remove any excess of phosgene from the reaction product of the first stage of the reaction, before proceeding directly to the second stage. The purging can be accomplished readily by passage through the reaction mixture and reaction vessel of a stream of an inert gas such as nitrogen, argon, krypton, xenon, and the like, using procedures well-known in the art. The purged solution of isocyanatophenol (III) so obtained is then treated, advantageously without removal from the reaction vessel in which the phosgenation stage has been carried out, with the appropriate amine $HNR_2R_3$. The latter amine can be employed as such or in the form of a solution in an inert organic solvent i.e. an organic solvent which does not itself enter into reaction with the isocyanatophenol (III). Examples of inert organic solvents are benzene, toluene, xylene, ether, dimethylformamide, dimethylsulfoxide, chlorobenzene, o-dichlorobenzene, and the like. Any of the highly polar aprotic solvents hitherto defined and exemplified can also be used as inert solvents for the amine.

While it is preferred, from the point of view of convenience of operation on a manufacturing scale, to add the amine to the isocyanatophenol (III), it is not essential to do so and any order of addition of reactants can be employed without detracting from the outcome of the desired reaction. In short the reaction between the isocyanatophenol (III) and the amine $HNR_2R_3$ can be carried out in accordance with any of the procedures known in the art for the reaction of an isocyanate with an amine to produce the corresponding urea.

Advantageously the reaction is carried out at a temperature of about 0° C. to about 100° C. and preferably at a temperature of about 20° C. to about 60° C. Generally the reaction proceeds at a satisfactory rate without the need to apply external heat but, if desired, the reaction temperature can be raised to a level within the upper limits set forth above to ensure completion. Completion of the reaction can be detected by standard procedures, for example by observation of the disappearance of the absorption band corresponding to the isocyanate group in the infrared spectrum of aliquots of the reaction mixture.

The amount of amine $HNR_2R_3$ employed in the reaction with the isocyanatophenol (III) in the second stage of the process of the invention is advantageously of the order of at least equimolar with respect to said isocyanatophenol (III). If desired an excess of amine, i.e. a proportion in excess of equimolar, can be employed bu generally offers little advantage in terms of yield of desired endproduct or of increased rate of reaction. However, it is to be noted that the hydrogen chloride generated in the phosgenation stage of the process of the invention is difficult to remove by purging from the reaction product obtained in the first stage. The excess hydrogen chloride can, if desired, be removed from the reaction mixture by partial evaporation of the latter prior to reaction with the amine. Alternatively an excess of amine, sufficient to neutralise any remaining hydrogen chloride and also to react completely with the isocyanate group, can be employed in this second stage of the process of the invention. The limit on the amount of amine used in excess of the proportions discussed above is generally imposed by economic considerations as will be obvious to one skilled in the art.

The desired ureidophenol (I) generally separates from the reaction mixture as a solid precipitate which is readily isolated by filtration, centrifugation, or like procedures. Alternatively the ureidophenol (I) can be isolated from the reaction mixture by procedures known in the art for the isolation of phenols, for example, by extraction of the reaction mixture with an excess of aqueous sodium or potassium hydroxide solution followed by liberation of the free phenol (I) by acidification of the alkaline extraction.

Examples of the amines $HNR_2R_3$, wherein $R_2$ and $R_3$ are as hereinbefore defined, which can be used in the process of the invention, are ammonia, monoalkylamines such as methylamine, ethylamine, butylamine, hexylamine, isooctylamine, and the like; dialkylamines such as dimethylamine, N-ethyl-N-methylamine, diisopropylamine, N-ethyl-N-hexylamine, N-methyl-N-isooctylamine and the like; primary alkenylamines such as allylamine, 2-butenylamine, 4-hexenylamine, 6-heptenylamine, 2-dodecenylamine, and the like; dialkenylamines such as diallylamine, di-2-butenylamine, di-3-hexenylamine, and the like; cycloalkylamines such as cyclopropylamine, cyclobutylamine, cyclopentylamine, cyclohexylamine, and the like; N-alkylcycloalkylamines such as N-methylcyclopentyamine, N-ethylcyclopentylamine, N-propylcyclohexylamine, and the like; cycloalkenylamines such as cyclopentenylamine, cyclohexenylamine, and the like; aralkylamines such as benzylamine, phenethylamine, phenylpropylamine, benzhydrylamine and the like; N-alkyl-N-aralkylamines such as N-methylbenzylamine, N-propylbenzylamine, N-isobutylbenzylamine, N-octylbenzylamine, N-methylphenethylamine, and the like; N-alkylarylamines such as N-methylaniline, N-isopropylaniline, N-hexylaniline, N-methyl-p-toluidine, N-ethyl-m-xylidine, N-methyl-1-naphthylamine, and the like, N-aralkylarylamines such as N-benzylaniline, N-phenethylamine, N-benzhydrylaniline, and the like; arylamines such as aniline, o-, m-, and p-toluidine, o-, m- and p-xylidine, 1-naphthylamine, 2-naphthylamine, and the like; heterocyclic amines such as pyrrolidine, alkylpyrrolidines such as 2-methylpyrrolidine, 2,2-dimethylpyrrolidine and the like, piperidine, alkylpiperidines such as 2-methylpiperidine, 3-methylpiperidine, 4-ethylpiperidine, and the like; morpholine, hexamethyleneimine, homomorpholine, and the like; and primary and secondary amines of the above type in which one or more of the carbon atoms is substituted by inert substituents as hereinbefore defined and exemplified.

The ureidophenols (I) produced in accordance with the process of the invention are useful as chemical intermediates. For example, they can be converted to the corresponding ureidophenyl carbamates which are known to be useful as herbicides; see, for example Netherlands application 6503645, supra. The procedures adopted to convert the ureidophenols (I) to the carbamates are those well-known in the art; for example the phenol (I) is reacted with (a) the appropriate hydrocarbyl isocyanate in the presence of a tertiary amine or (b) the appropriately N-substituted carbamoyl chloride in accordance with procedures described in the above-identified Netherlands application.

In addition the ureidophenols (I) are useful as intermediates in the preparation of the corresponding phenolic resins. For this purpose the ureidophenols (I) are reacted with formaldehyde and like aldehydes under conditions well-known in the art; see, for example, Encyclopedia of Chemical Technology, ed. Kirk-Othmer, 10, p. 335 et seq. Interscience Publishers, New York, 1953.

The novel process of the invention enables the ureidophenols (I) to be produced in high yield using much less expensive reaction components and conditions then heretofore known in the art. Accordingly, the novel process of the invention enables the cost of producing the ureidophenols to be reduced significantly and this, in turn, leads to a corresponding reduction in cost of the final products, such as the aforementioned herbicides, derived from the ureidophenols (I)

While the process of the invention has broad applicability to the conversion of any m- or p-aminophenol to the corresponding ureidophenol it has particular application to the conversion of the unsubstituted m- and p-aminophenols themselves. The compounds m-isocyanatophenol and p-isocyanatophenol which are obtained therefrom in the first stage of the process of the invention are novel compounds which could not be prepared by hitherto known methods for the synthesis of isocyanates. These compounds, in addition to their usefulness in the preparation of the ureidophenols (I), are also useful in that they can be reacted with alcohols such as methanol, ethanol and the like, under conditions well-known in the art for the reaction of isocyanates and alcohols, to give the corresponding alkylcarbamidophenols. The latter are then converted, for example by reaction with the appropriate carbamoyl chloride, under conditions such as those dedescribed above, to obtain the corersponding bis-carbamates which, as is described in Belgian Patent 679,283 and Eire application 349/66,, are active as herbicides.

The following examples describe the manner and process of making and using the invention and set forth the best mode contemplated by the inventors of carrying out the invention but are not to be construed as limiting.

Example 1.—m-isocyanatophenol

A solution of 21.8 g. (0.2 mole) of m-aminophenol in 200 ml. of ethyl acetate was added slowly with cooling and stirring to a solution of 40 g. (0.4 mole) of phosgene in 100 ml. of ethyl acetate. The temperature of the mixture during the addition was not allowed to rise above 8° C. When the addition was complete the mixture was heated to reflux and a stream (1 g./min.) of phosgene was passed into the reaction mixture until evolution of hydrogen chloride had ceased. The resulting mixture was purged with nitrogen before removing the solvent by distillation under reduced pressure. The residue (26.8 g.:99% theoretical yield) was m-isocyanatophenol. The product was purefied by heating under vacuum at 80° C. for 10 minutes to obtain a solid polymer having a melting point of 278 to 280° C. which was triturated with acetone to remove impurities. A sample (4.5 g.) of the washed polymer was heated at 200 to 300° C. at a pressure of 0.05 mm. of mercury to yield 2.2 g. of m-isocyanatophenol as a mobile colourless liquid having a boiling point of approximately 80° C./0.05 mm.;

$\lambda_{max.}^{CHCl_3}$ (infrared): OH:2.8, 3.0$\mu$; N=C=O:4.43; $\lambda_{max.}^{dioxane}$ (infrared):OH:3.05$\mu$; N=C=O:4.43$\mu$ A sample (1.3 g.) of the latter compound was added to excess methanol and the mixture was evaporated to dryness to yield 1.6 g. of methyl 3-hydroxyphenylcarbamate having a melting point of 94 to 95° (Erie application 349/66 reports a melting point of 94 to 95° for this compound).

Example 2.—p-isocyanatophenol and 1-(4-hydroxyphenyl)-3-isopropylurea

A solution of 21.8 g. (0.2 mole) of p-aminophenol in 200 ml. of ethyl acetate was added dropwise with stirring, over a period of 15 minutes, to a solution of 40 g. (0.4 mole) of phosgene in 100 ml. of ethyl acetate. When the addition was complete the reaction mixture was heated to reflux and phosgene at a rate of 1 g./min. was passed into the mixture until evolution of hydrogen chloride ceased. The resulting mixture was purged with nitrogen and cooled to room temperature (circa 25° C.). The solution so obtained was divided into two equal portions which were treated as follows:

(a) This portion of the solution was evaporated to dryness under pressure and the residue was maintained at 80° C. for 10 minutes under vacuum. There was thus obtained 13.3 g. (98% theoretical yield) of a solid polymer which did not melt at 300° C. This polymer was triturated with acetone and then heated at 200 to 300° C. under vacuum (0.05 mm. of mercury) to obtain substantially pure p-isocyanatophenol.

(b) This portion of the solution was added dropwise with stirring to a solution of 7 g. (0.12 mole) of isopropylamine in 50 ml. of ethyl acetate. An exothermic reaction occurred and the temperature rose to a maximum of 44° C. The crude oil which separated was dissolved in an excess of 5% aqueous sodium hydroxide solution. The aqueous alkaline solution was separated and acidified by the addition of hydrochloric acid. The solid which separated was isolated by filtration and dried. There was thus obtained 13.65 g. (70.4% theoretical yield) of 1-(4-hydroxyphenyl)-3-isopropylurea having a melting point of 166 to 168° C.

Example 3.—1-(3-hydroxyphenyl)-3,3-dimethylurea

A solution of 109 g. (1 mole) of m-aminophenol in 500 ml. of dioxane was added dropwise, over a period of 70 minutes, to a solution of 198 g. (2 moles) of phosgene in 500 ml. of dioxane. The temperature of the reaction mixture was maintained at 6 to 12° C. throughout the addition. When the addition was complete the reaction mixture was heated to reflux and phosgene was passed into the mixture at a rate of 1 g./min. for the next 45 minutes at the end of which time evolution of hydrogen chloride from the reaction mixture had ceased. The resulting mixture was purged with nitrogen at reflux for 60 minutes and was then cooled to 20° C. To the cooled, stirred solution was added gaseous dimethylamine at a rate of approximately 1 g./min. for 77 minutes. During the addition the temperature of the reaction mixture rose to 59° C. When the addition of dimethylamine had been completed the solid which had separated was isolated by filtration ot yield 145 g. (80.6% theoretical yield) of 1-(3-hydroxyphenyl)-3,3-dimethylurea having a melting point of 182 to 186° C. A second crop of the urea (43 g.; melting point 188 to 195° C.) was obtained by concentration of the mother liquors. The combined crops of material were purified by slurrying with acetone to give a total yield of 167.2 g. (93% theoretical yield based on aminophenol) of 1-(3-hydroxyphenyl)-3,3-dimethylurea having a melting point of 194 to 197° C.

Example 4.—1-(3-hydroxyphenyl)-3,3-dimethylurea

A solution of 225 parts by weight of phosgene in 768 parts by weight of ethyl acetate was maintained at 7 to 10° C. while a solution of 163.5 parts by weight of m-aminophenol in 1200 parts by weight of dry ethyl acetate was added slowly with stirring. When the addition was complete the mixture was heated quickly to 45° C. and maintained thereat for 2 hours. At the end of this time the mixture was purged with nitrogen at 62 to 67° C. and then cooled to about 25° C. The cooled solution of m-isocyanatophenol was agitated and maintained at 25 to 30° C. while gaseous dimethylamine was added. The addition of dimethylamine was continued until the pH of the reaction mixture reached 8.0. At this point the reaction mixture was purged with nitrogen for 10 minutes and then filtered. The solid so isolated was washed with water and dried to obtain 225 parts by weight of 1-(3-hydroxyphenyl)-3,3-dimethylurea having a melting point of 185 to 190° C.

Example 5.—2,6-dichloro-4-isocyanatophenol

A solution of 35.0 g. (0.2 mole) of 4-amino-2,6-dichlorophenol in 200 ml. of ethyl acetate was added slowly with stirring to a solution of 40 g. (0.4 mole) of phosgene in 100 ml. of ethyl acetate. The resulting mixture was heated to reflux and a stream of phosgene (1 g./min.) was passed in until evolution of hydrogen chloride ceased. The resulting mixture was purged with nitrogen and evaporated to dryness under reduced pressure. The residue (39.2 g.; 96% theoretical yield) was 2,6-dichloro-4-isocyanatophenol in the form of a solid of melting point 76–78° C.

The preparation of 2,6-dichloro-4-isocyanatophenol by phosgenation of the above amine in chlorobenzene solution is described in German Auselgeschrift 1,170,398. The reported yield was 52% of theoretical.

Example 6

Using the procedure described in Example 1, but replacing m-aminophenol by the known 3-amino-4-methoxyphenol, 5-amino-2 - (2-methylpropenyl)phenol, 4-amino-3,5-dichlorophenol, 4 - amino - 3 - chlorophenol, 2-allyl-4-aminophenol, 4-amino - 2 - t. - butyl-6-(1-methylpentyl) phenol, 4-amino-5-chloro-2-pentylphenol, 5-amino-2,3,6-trichlorophenol, 5-amino-2-(butylthio)phenol or 4-amino-2,6-dimethoxyphenol, there are obtained 3-isocyanato-4-methoxyphenol, 5 - isocyanato - 2 - (2 - methylpropenyl) phenol, 4-isocyanato-3,5-dichlorophenol, 4-isocyanato-3-chlorophenol, 2-allyl-4-isocyanatophenol, 4-isocyanato-2-t.-butyl-6-(1-methylpentyl)phenol, 4-isocyanata-5-chloro-2-pentylphenol, 5-isocyanato-2,3,6-trichlorophenol, 5-isocyanato - 2 - (butylthio)phenol, and 4-isocyanato-2,6-dimethoxyphenol, respectively.

Example 7

A solution of 7.3 g. (0.1 mole) of diethylamine in 100 ml. of diethyl ether is added slowly with stirring to a solution of 13.5 g. (0.1 mole) of 3-isocyanatophenol in 100 ml. of ethyl acetate. The mixture is stirred for a short period after the addition is complete and the solid which has separated is isolated by filtration, washed with ether, and dried. There is thus obtained 1-(3-hydroxyphenyl)-3,3-diethylurea in the form of a solid.

Using the above procedure but replacing diethylamine by allylamine, diallylamine, cyclopentylamine, N-methylcyclopentylamine, cyclopentylamine, benzylamine, benzhydrylamine, N-methylbenzylamine, N-methylaniline, N-ethylaniline, aniline, p-toluidine, pyrrolidine, piperidine, morpholine, or hexamethyleneimine, there are obtained 1-(3-hydroxyphenyl)-3-allylurea, 1-(3-hydroxyphenyl)-3,3-diallylurea, 1-(3-hydroxyphenyl)-3-cyclopentylurea, 1-(3 - hydroxyphenyl)-3-methyl-3-cyclopentylurea, 1-(3-hydroxyphenyl)-3-cyclopentylurea, 1-(3-hydroxyphenyl)-3-benzylurea, 1-(3-hypentenylurea, 1-(3-hydroxyphenyl)-3-benzylurea, 1-(3-hydroxyphenyl)-3-benzhydrylurea, 1-(3-hydroxyphenyl)-3-methyl - 3 - benzylurea, 1-(3-hydroxyphenyl)-3-methyl-3-phenylurea, 1-(3-hydroxyphenyl) - 3-ethyl-3-phenylurea, 1-(p-hydroxyphenyl)-3-phenylurea, 1-(3-hydroxyphenyl-3-p-tolylurea, N-(3-hydroxyphenylcarbamoyl)pyrrolidine, N - (3-hydroxyphenylcarbamoyl)piperidine, N-(3-hydroxyphenylcarbamoyl)morpholine, and N-(3-hydroxyphenylcarbamoyl) - hexamethylenimine, respectively.

Example 8

A solution of 10.9 g. (0.1 mole) of m-aminophenol in 50 ml. of ethyl acetate was added to a solution of 7.5 g. (0.075 mole) of phosgene in 50 ml. of ethyl acetate. The addition was made rapidly and the temperature rose to 45° C. When the addition was complete the mixture was cooled to 10° C. and held thereat for a short period. The reaction mixture was then heated to 45 to 50° C. and held at that temperature for 1 hr. Thereafter the mixture was heated at reflux and phosgene was passed into the mixture until a clear solution was obtained. The amount of phosgene required was 7.5 g. (0.075 mole). The resulting mixture was purged with nitrogen for 1.25 hr. and a total of 8.0 g. of gaseous dimethylamine was passed into the purged mixture. The solid which separated was isolated by filtration, washed on the filter with 150 ml. of hot water and then dried. There was thus obtained 14.4 g. (80% theoretical yield) of 1-(3-hydroxyphenyl)-3,3-dimethylurea in the form of a solid having a melting point of 187 to 193° C.

What is claimed is:
1. m-Isocyanatophenol.
2. p-Isocyanatophenol.

References Cited

UNITED STATES PATENTS

| 2,625,561 | 1/1953 | Werntz | 260—453 |
| 2,875,226 | 2/1959 | Bloom et al. | 260—453 |
| 2,884,435 | 4/1959 | Tazuma | 260—453 |
| 2,908,704 | 10/1959 | Skiles | 260—453 |
| 3,040,082 | 6/1962 | Hoover | 260—453 |
| 3,297,726 | 1/1967 | Zecher et al. | 260—453 XR |

OTHER REFERENCES

Lesser et al., Chemical Abstracts, vol. 20, p. 1616 (1926).

Tachi et al., Chemical Abstracts, vol. 53, p. 20902 (1959).

Radek et al., Chemical Abstracts, vol. 62, pp. 3966–7 (1965).

CHARLES B. PARKER, Primary Examiner

DOLPH H. TORRENCE, Assistant Examiner

U.S. Cl. X.R.

71—106, 111; 260—454, 465, 471, 482, 553, 575, 838